(No Model.)

S. M. GUSS.

BEARING AND BUSH.

No. 317,993. Patented May 19, 1885.

WITNESSES
Ida F. Kinsey.
Ellen P. Kinsey.

INVENTOR
Samuel M. Guss
pr Thomas P. Kinsey
Attorney

UNITED STATES PATENT OFFICE.

SAMUEL M. GUSS, OF READING, PENNSYLVANIA, ASSIGNOR OF ONE-HALF TO JACOB S. AMMON, OF SAME PLACE.

BEARING AND BUSH.

SPECIFICATION forming part of Letters Patent No. 317,993, dated May 19, 1885.

Application filed April 13, 1885. (No model.)

*To all whom it may concern:*

Be it known that I, SAMUEL M. GUSS, a citizen of the United States, residing at the city of Reading, county of Berks, State of Pennsylvania, have invented a new and useful Improvement in Bearings and Bushes, of which the following is a specification.

This invention is more particularly related to the wheels for roller-skates; but it is applicable to solid bearings of every description.

The object of the improvement is to produce a bearing in a measure indestructible, free, to a marked extent, from friction, readily applied, requiring only occasional lubrication, and that is adapted to be used for ship-blocks, roller-skate wheels, axle-bearing boxes for vehicles, and all solid bearing-boxes.

The drawings herewith show the manner in which the above objects are attained, similar letters upon which indicate similar parts.

Figure 1:
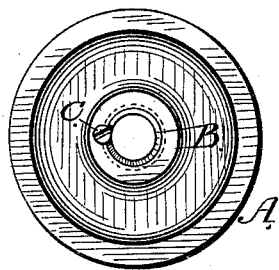
Figure 2:
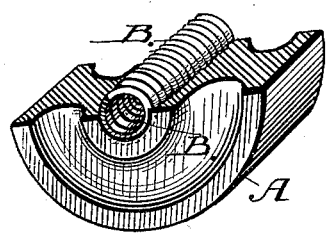
Figure 3:
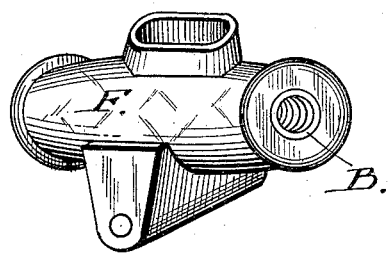
Figure 4:
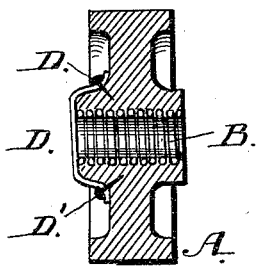
Figure 5:

Figure 1 is an elevation of a roller-skate wheel; Fig. 2, the same wheel shown in perspective, and partially broken away to disclose the application of my improvement thereto. Fig. 3 represents the application of the improvement to a line-shaft hanger-box. Fig. 4 represents a roller-skate wheel in section, showing the application of a spun metal cap to lock the bush in place. Fig. 5 represents the improvement applied to a vehicle axle-box.

A represents the body of a roller-skate wheel; B, a coil of steel wire; C, a screw or pin to prevent movement of the coil; D, a spun metallic cap to prevent movement of the coil in lieu of the screw or pin C, and D' screws to secure the cap in place; E, an ordinary axle-box for vehicle-axles, and F an ordinary line-shaft box.

It has long been a desideratum in the mechanical arts to produce a bearing or bush that would be adapted to the majority of shafts, axles, and pivots, and could readily be adapted to supplant those in use without involving radical changes in the arrangement of the machinery as set up.

My invention is more particularly intended to be used in bearings bored out of the solid, and is especially adapted to meet the above requirements, and may be used in loose pulleys, ship-block sheaves, roller-skate wheels, line-shaft bearings, carriage-wheel boxes, and for sewing-machines, and textile machinery generally, requiring a fine bearing-surface and minimum friction.

The improvement is in constructing a bearing for the shaft or axle of steel wire, preferably of a round cross-section, closely coiled upon a mandrel of a form adapted to the bearing, cutting the coils to length for the articles in which they are to be placed, facing off the ends, and previous to insertion hardening or tempering the coil to any desired degree of hardness.

The hubs of rollers, sheaves, &c., or the cast-iron or other metallic bearings for line and other shafts, are placed in a suitable chuck in a boring-lathe and enlarged in bore equal to the diameter of the axles or shaft, plus once the diameter of the wire of the coil. Then with a suitable round-nosed tool a thread is chased within the bore of a pitch equal to that of the coil, the depth of the thread, measured from out to out, equal to the outer diameter of the coil. This having been done, by the use of suitable mandrels and tools, the coil is screwed within the thread provided for it, the coil end faces coinciding with the outer ends of the hubs or bearings. To further secure the coil in place a small screw or pin is driven into the bore of the hub immediately against the end of the spiral, which will prevent the same from unscrewing itself from the bore; or, in lieu of the same, a spun cap of metal perforated for the axle may be secured by screws to the disk-face of the roller, as shown in Fig. 4.

A bearing or bush constructed, as described, of a close coil of steel wire tempered is practically without friction. In the ordinary bearing inequalities of surface in both journal and bearing abrade one against the other in a direct circumferential line, whereby cutting of the surface and increased friction must result, whereas with the wire coil the bearing is nominally changed by the angularity of the coil, the coil as it passes around the axle or the journal as it revolves within the bearing having at each moment of their respective revolutions a new surface upon which to act, with a consequent reduction of friction from its use. Less lubrication is requisite, as the lubricant fills up the interstices between the coil upon the bearing and back, which is gradually swept over the bearing from end to end by the action of the coil.

The wire may vary in diameter, according to the weight hung upon the journals. For the majority of cases wire from one-sixteenth to three-sixteenths of an inch will be found ample. The coils being tempered, the wear will, in comparison with the ordinary bearings, be found so trivial that it need not be taken into account, and as the stress is sustained by the inclosing hub, wheel, sheave, or box, outside of allowance for wear, the smallest diameter of wire may be used. Should the bearing from any cause give out, it is readily replaced by reversing the operation of application and reinserting a new coil.

Having shown my invention, described its construction and application, together with its advantages, I desire to secure by Letters Patent the following claims therefor:

1. As a new article of manufacture, a bearing and bush for axles, shaft-journals, &c., consisting of a coil of steel or equivalent wire, preferably of a round cross-section, adapted by winding upon a mandrel of suitable form to the surface to which it is to be applied, cut to length, subsequently faced, tempered, and inserted within the receptacle prepared therefor, substantially as shown, and for the purpose described.

2. As a new article of manufacture, a bush for loose pulleys, ship-block sheaves, rollers for skates, and analogous purposes, consisting, essentially, of a metallic wire coil, preferably steel, of a round cross-section, adapted by winding upon a suitable mandrel, cutting to length, subsequent facing and tempering, for insertion within the hubs of the same, and their retention therein by screw C and cap D, as and for the purpose set forth.

SAML. M. GUSS.

Witnesses:
JAMES R. KENNEY,
THOS. K. DALZELL.